United States Patent [19]

Hagersten et al.

[11] Patent Number: 5,835,906
[45] Date of Patent: Nov. 10, 1998

[54] METHODS AND APPARATUS FOR SHARING STORED DATA OBJECTS IN A COMPUTER SYSTEM

[75] Inventors: Erik E. Hagersten, Palo Alto, Calif.; Mark Donald Hill, Madison, Wis.

[73] Assignee: Sun Microsystems, Inc., Palo Alto, Calif.

[21] Appl. No.: 673,130

[22] Filed: Jul. 1, 1996

[51] Int. Cl.[6] .................................................. G06F 17/30
[52] U.S. Cl. ..................................................... 707/8; 707/1
[58] Field of Search ..................................... 395/601, 602, 395/603, 607, 608, 609, 610, 611, 616, 617, 618, 619, 620, 468, 823, 825, 840; 707/1, 2, 3, 7, 8, 9, 10, 100

[56] References Cited

U.S. PATENT DOCUMENTS

| | | | |
|---|---|---|---|
| 5,442,758 | 8/1995 | Slingwine et al. | 395/608 |
| 5,483,641 | 1/1996 | Jones et al. | 395/823 |
| 5,566,349 | 10/1996 | Trout | 395/840 |
| 5,568,639 | 10/1996 | Wilcox et al. | 395/616 |
| 5,608,893 | 3/1997 | Slingwine et al. | 395/468 |
| 5,619,723 | 4/1997 | Jones et al. | 395/823 |

*Primary Examiner*—Thomas G. Black
*Assistant Examiner*—Ruay Lian Ho
*Attorney, Agent, or Firm*—Beyer & Weaver, LLP

[57] ABSTRACT

A method, in a computer system having a first plurality of stored data objects and capable of running multiple threads concurrently, for preventing access conflicts. The method includes the step of providing a dynamic lock structure having a plurality of dynamic lock structure members. There is also the step of mapping a second plurality of stored data objects of the first plurality of stored data objects into a first dynamic lock structure member of the plurality of dynamic lock structure members in accordance with a mapping function. Due to the mapping function, the plurality of dynamic lock structure members become fewer in number than the number of the first plurality of stored data objects. The first dynamic lock structure member is configured to store identities of a third plurality of stored data objects. The third plurality of stored data objects represent a subset of the second plurality of stored data objects that are accessed, whereby a stored data object having its identity stored in the dynamic lock structure cannot be accessed by any thread other than a thread currently accessing the stored data object.

25 Claims, 10 Drawing Sheets

METHODS AND APPARATUS FOR SHARING STORED DATA OBJECTS IN A COMPUTER SYSTEM

BACKGROUND OF THE INVENTION

The present invention relates to methods and apparatus for sharing stored data objects in a computer system. More specifically, the present invention relates to methods and apparatus for permitting a plurality of processes or threads to efficiently and correctly access a plurality of stored data objects.

In modern computer systems, multiple processes or threads may at times wish to access the same stored data object for the purpose of writing to or reading from it. As the terms are used herein, software processes or threads may be used interchangeably and generally refer to logically distinct execution streams. By way of example, multiple functions running concurrently are said to be executing in different processes or threads.

Generally, it is possible to execute multiple threads via a single processor, multiple processors, or even multiple computers in a computer network. For illustration purposes, FIG. 1A depicts an example of a multi-propramming situation, wherein multiple threads are executed in a multiplexed manner via a processor 102. From the perspectives of the threads, it is as if the threads are executed in different processors instead of in one multiplexing processor.

In FIG. 1A, there is shown a storage facility 110, representing the storage space associated with the computer system of FIG. 1A for storing data. Storage facility (hereinafter "SF") 110 may represent, for example, any device or combination of devices that is capable of storing data such as semiconductor memory, flash memory, virtual memory, magnetic or optical storage devices, or the like.

Within storage facility 110, there are shown a plurality of stored data objects 112, 114, and 116. Each of stored data objects 112, 114, and 116 represents a unit of data storage that one of threads 104, 106, or 108 may wish to access to write to or to read from. Each stored data object may be structured and arranged in any number of ways to suit the particular tasks implemented by the threads. By way of example, if threads 104, 106, and 108 represent processes for manipulating data in a database, stored data object 112 may represent, for example, a database record that any of threads 104–108 can write to or read from. Of course, any arbitrary number of stored data objects may be provided within storage facility 110. In a database, for example, there may be millions or more stored data objects, representing records that are accessible by the threads.

It should also be borne in mind that although the term "object" is used herein to describe a unit for storing data to be manipulated by a thread, it is not intended that the invention be limited to what is commonly referred to in contemporary literature as "object-oriented" approaches to software implementation. In fact, it is intended that the invention herein may be implemented using any conventional programming approach, including but not limited to the aforementioned object-oriented approach.

As mentioned, multiple threads may also be implemented via multiple processors. FIGS. 1B and 1C depict two different multi-processing situations wherein multiple threads are executed on multiple processors (FIG. 1B) and/or multiple computer systems (FIG. 1C). In FIG. 1B, there is shown a computer system 120 having multiple processors 122, 124, and 126, each of which may be executing a different one of threads 130, 132, and 134 for accessing stored data objects 112, 114, and 116. FIG. 1C shows another variation wherein threads 150, 152, and 154 are executed on different computer systems 160, 162, and 164. Each of threads 150, 152, and 154 may access any of stored data objects 112, 114, and 116 within storage facility 110.

If two or more threads never attempt to access on the same stored data object, there may be no access conflict. When multiple threads wish to access the same stored data object, e.g., stored data object 112 of FIG. 1B, at the same time, the simultaneous accessing of stored data object 112 may give rise to erroneous results. To illustrate, consider the situation wherein thread 130 wishes to update the data within stored data object 112. If another thread 132 is allowed to access stored data object 112 to read therefrom while thread 130 is updating the content of stored data object 112, an access conflict may occur. This is because thread 132 may be able to obtain only a partially updated copy of stored data object 112. Because of the access conflict, thread 132 may thus receive erroneous data.

In the prior art, there have been proposed a number of techniques for avoiding the aforementioned access conflict problem. FIG. 2 illustrates a prior art technique for avoiding the access conflicts that may arise when multiple threads are permitted to simultaneously access a single stored data object. Referring now to FIG. 2, there are shown multiple threads 202, 204, and 206, representing threads which are capable of accessing stored data objects 180, 182, 184, 186, 188, and 189 in storage facility 110. To prevent access conflict, there is associated with each of the stored data objects 180–189, a locking flag. For example, there are shown locking flags 190, 192, 194, 196, 198, and 199, which correspond to respective stored data objects 180, 182, 184, 186, 188, and 189.

When a thread, e.g., thread 202, accesses a stored data object, e.g., stored data object 180, it sets the locking flag corresponding with the accessed stored data object. In the case of stored data object 180, corresponding locking flag 190 is set when thread 202 accesses stored data object 180. While locking flag 190 is set, no other thread, e.g., thread 204 or 206, may access stored data object 180. When thread 202 completes its access, it resets locking flag 190, thereby permitting another thread to access stored data object 180.

The prior art technique of avoiding access conflict works adequately for a relatively small number of stored data objects. However, for systems having a large number of stored data objects, e.g., in the millions, the requirement of a flag for every stored data object represents a highly inefficient use of storage facility resource since millions or more of flags may be required for a large number of stored data objects. If each flag requires, for example a byte (i.e., 8 bits) or a word (i.e., 32 bits) as is commonly done to improve the speed at which flags can be read from or written to, the number of bits required to implement all the prior art flags may become prohibitively high. Even if each flag requires only one bit, such a large number of flags represents, in some systems, an unacceptably high storage facility overhead for the mere purpose of preventing access conflict.

Furthermore, the number of bits per stored data object may be modest in some systems. In this case, the ratio of the number of bits required to implement flags to the number of bits employed for actual data storage may be unacceptably high. This overhead ratio also tends to increase, as can be appreciated, as the size of the stored data object shrinks.

In view of the foregoing, what is needed are improved methods and apparatuses for avoiding the access conflicts that may arise when multiple threads attempt to access the same stored data object.

SUMMARY OF THE INVENTION

The invention relates, in one embodiment, to an apparatus in a computer system having a first plurality of stored data objects and capable of running multiple threads concurrently, for preventing access conflicts. The access conflicts arise when more than one of the multiple threads were allowed to simultaneously access one of the first plurality of stored data object.

The apparatus includes a dynamic lock structure having a plurality of dynamic lock structure members. The plurality of dynamic lock structure members are fewer in number than the number of the first plurality of stored data objects, wherein a second plurality of stored data objects of the first plurality of stored data objects map into a first dynamic lock structure member of the plurality of dynamic lock structure members in accordance with a mapping function. The mapping function renders it likely that only one stored data object of the second plurality of stored data objects that maps into the first dynamic lock structure member is accessed at any given point in time by a thread of the multiple threads.

There is also included a storage facility associated with the first dynamic lock structure member for storing identities of a third plurality of stored data objects. The third plurality of stored data objects represents a subset of the second plurality of stored data objects that are currently being accessed, whereby a stored data object having its identity stored in the dynamic lock structure cannot be accessed by any thread other than a thread currently accessing the stored data object.

In another embodiment, the invention relates to a method, in a computer system having a first plurality of stored data objects and capable of running multiple threads concurrently, for preventing access conflicts. The method includes the step of providing a dynamic lock structure having a plurality of dynamic lock structure members. There is also the step of mapping a second plurality of stored data objects of the first plurality of stored data objects into a first dynamic lock structure member of the plurality of dynamic lock structure members in accordance with a mapping function. Due to the mapping function, the plurality of dynamic lock structure members become fewer in number than the number of the first plurality of stored data objects. The first dynamic lock structure member is configured to store identities of a third plurality of stored data objects. The third plurality of stored data objects represent a subset of the second plurality of stored data objects that are accessed, whereby a stored data object having its identity stored in the dynamic lock structure cannot be accessed by any thread other than a thread currently accessing the stored data object.

These and other advantages of the present invention will become apparent upon reading the following detailed descriptions and studying the various figures of the drawings.

DETAILED DESCRIPTION OF THE PREFERRED EMBODIMENTS

An invention is described for, among others, permitting a plurality of processes or threads to efficiently and correctly access a plurality of data objects. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

In accordance with one aspect of the present invention, the prior art requirement of a locking flag for every stored data object is advantageously obviated. It is recognized that at any given point in time, the actual number of stored data objects being accessed is smaller than the total number of stored data objects in a given storage facility. Given this recognition, it is advantageously realized that there is no need to physically provide for a lock in the storage facility for every stored data object since at any given point in time, a large number of stored data objects are not accessed by any thread (and therefore pose no serious risk of access conflict). The challenge, however, is to reduce the number of locks physically implemented to prevent access conflict (and thereby reducing the storage facility overhead dedicated to this purpose) while advantageously allowing a thread to access a stored data object and locks other threads out in a speedy and efficient manner.

Figure 1A:
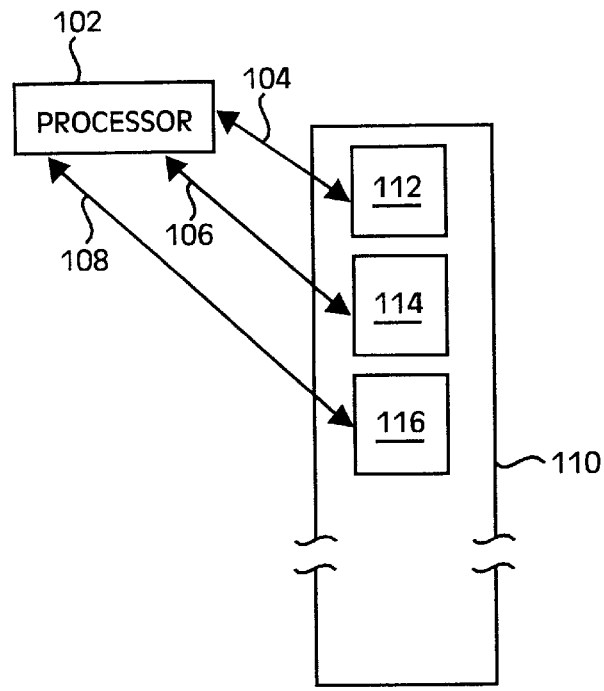
FIG. 1A depicts a multi-propramming situation, wherein multiple threads are executed in a multiplexed manner via a processor.
Figure 1B:
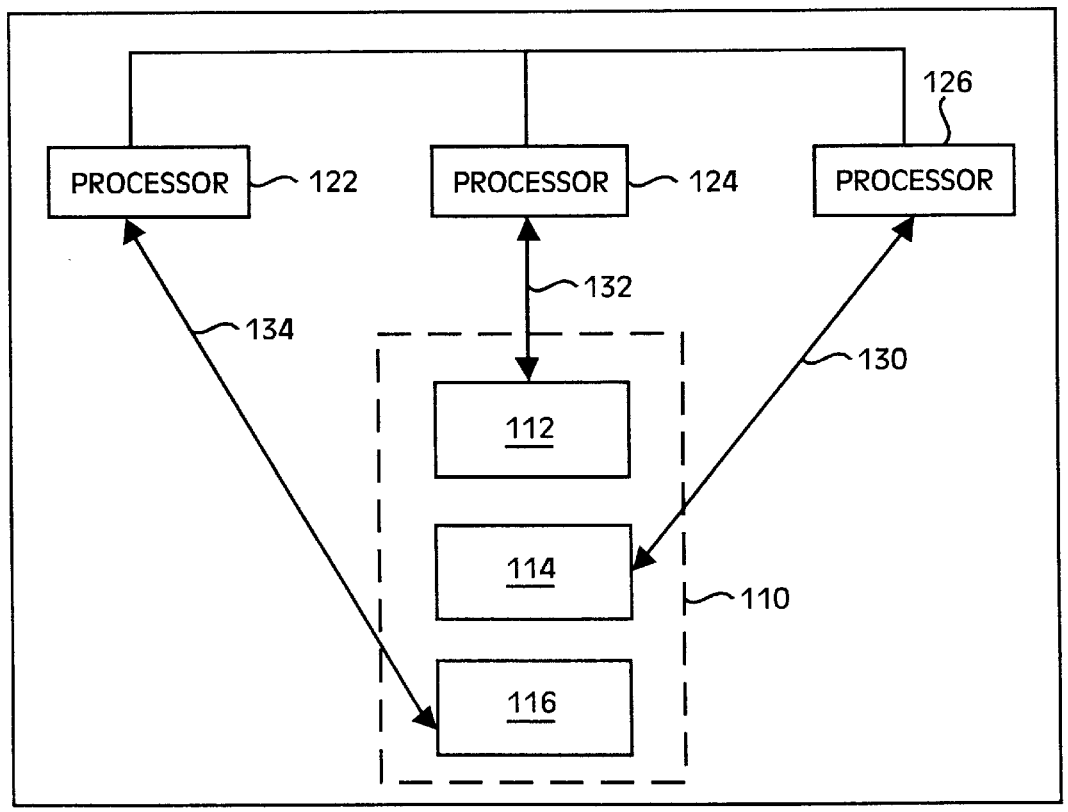
FIGS. 1B and 1C depict two different multi-processing situations wherein multiple threads are executed on multiple processors (FIG. 1B) and/or multiple computer systems (FIG. 1C).
Figure 1C:
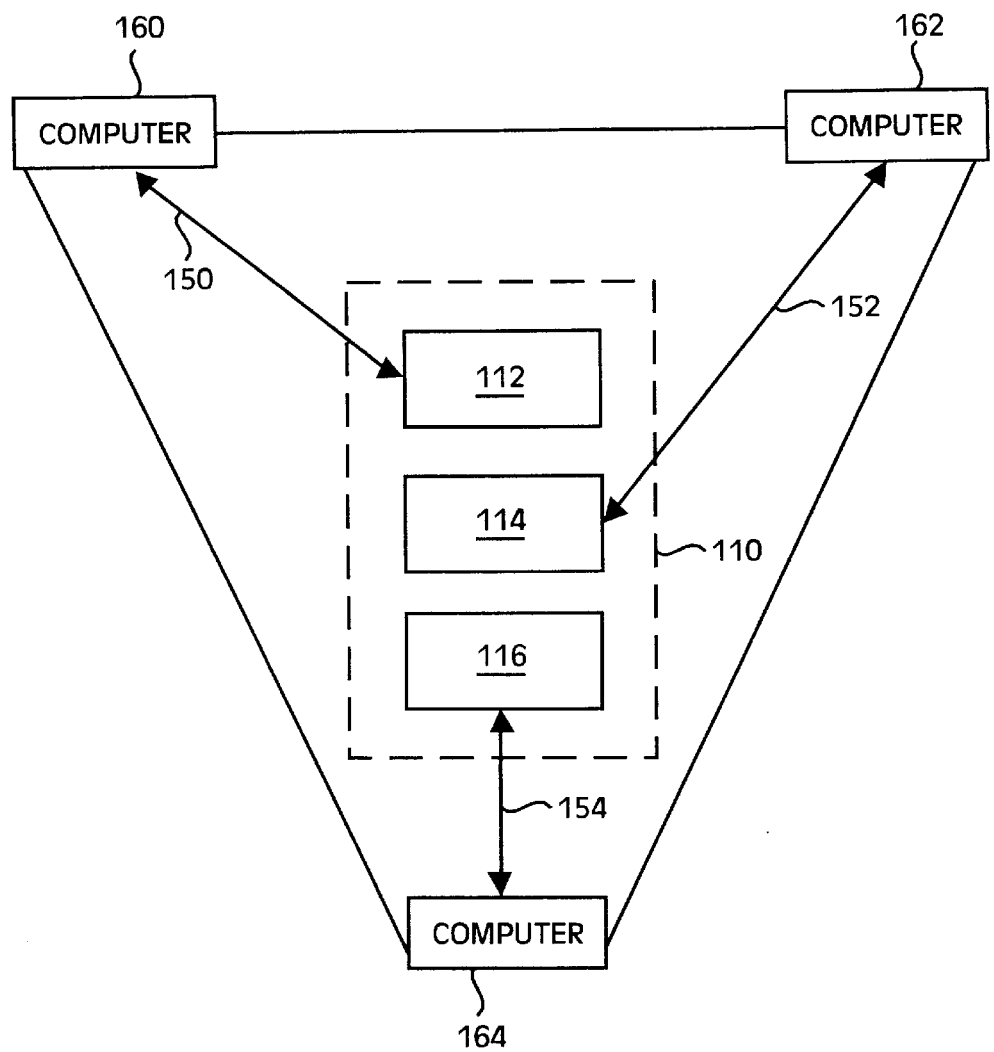
Figure 2:
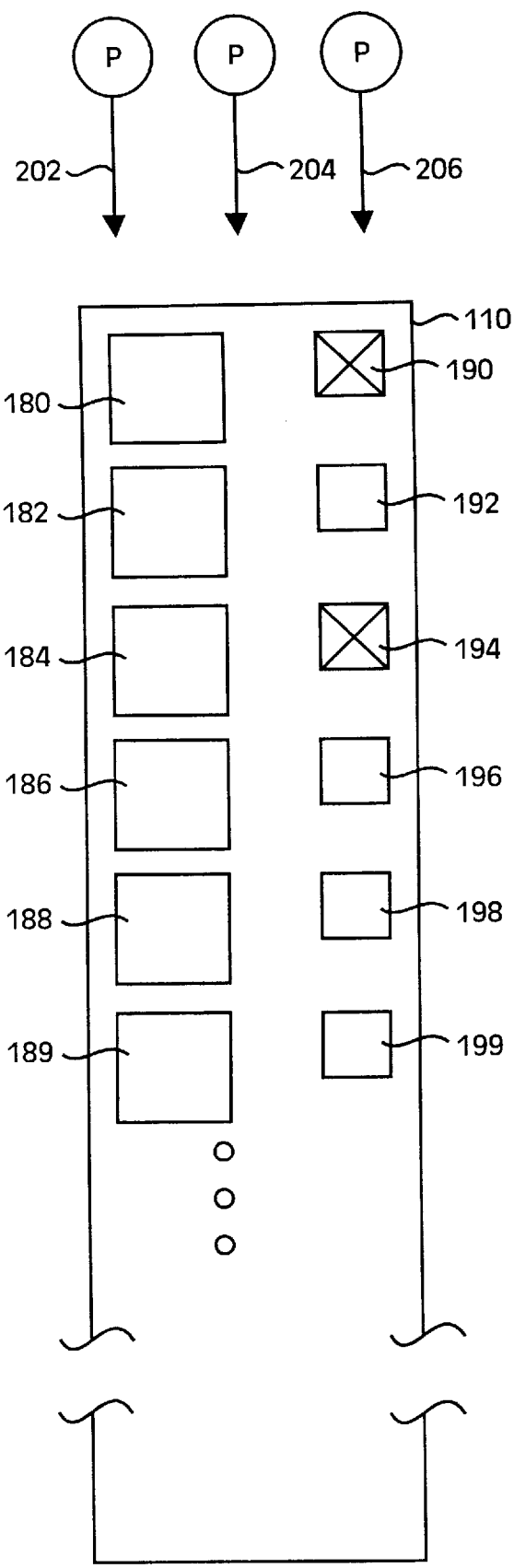
FIG. 2 illustrates a prior art technique for avoiding the access conflicts that may arise when multiple threads are permitted to simultaneously access a single stored data object.

In accordance with one aspect of the present invention, there are provided a plurality of physical locks for locking out stored data objects are currently accessed by a thread. As the term is used herein, a physical lock refers generally to a device actually implemented in memory, and whose implementation requires some amount of storage facility resource. The number of physical locks provided in accordance with the present invention is, unlike the prior art approach of FIG. 2, advantageously fewer in number than the number of available stored data objects. For example, a system may use 1000 physical locks to implement millions of conceptual locks for tracking access to millions of stored data objects.

Conceptually speaking, there is still associated with every stored data object a logical, or conceptual lock. Although there are as many conceptual locks in the present invention as there are actual physical locks in the prior art for a given system, the conceptual locks of the present invention advantageously do not require any real storage facility resource to implement. Their depiction herein is intended to cast the invention in terms familiar to those skilled in the art, it should always be kept in mind that conceptual locks do not need to be implemented in a real world computer system.

Figure 3:
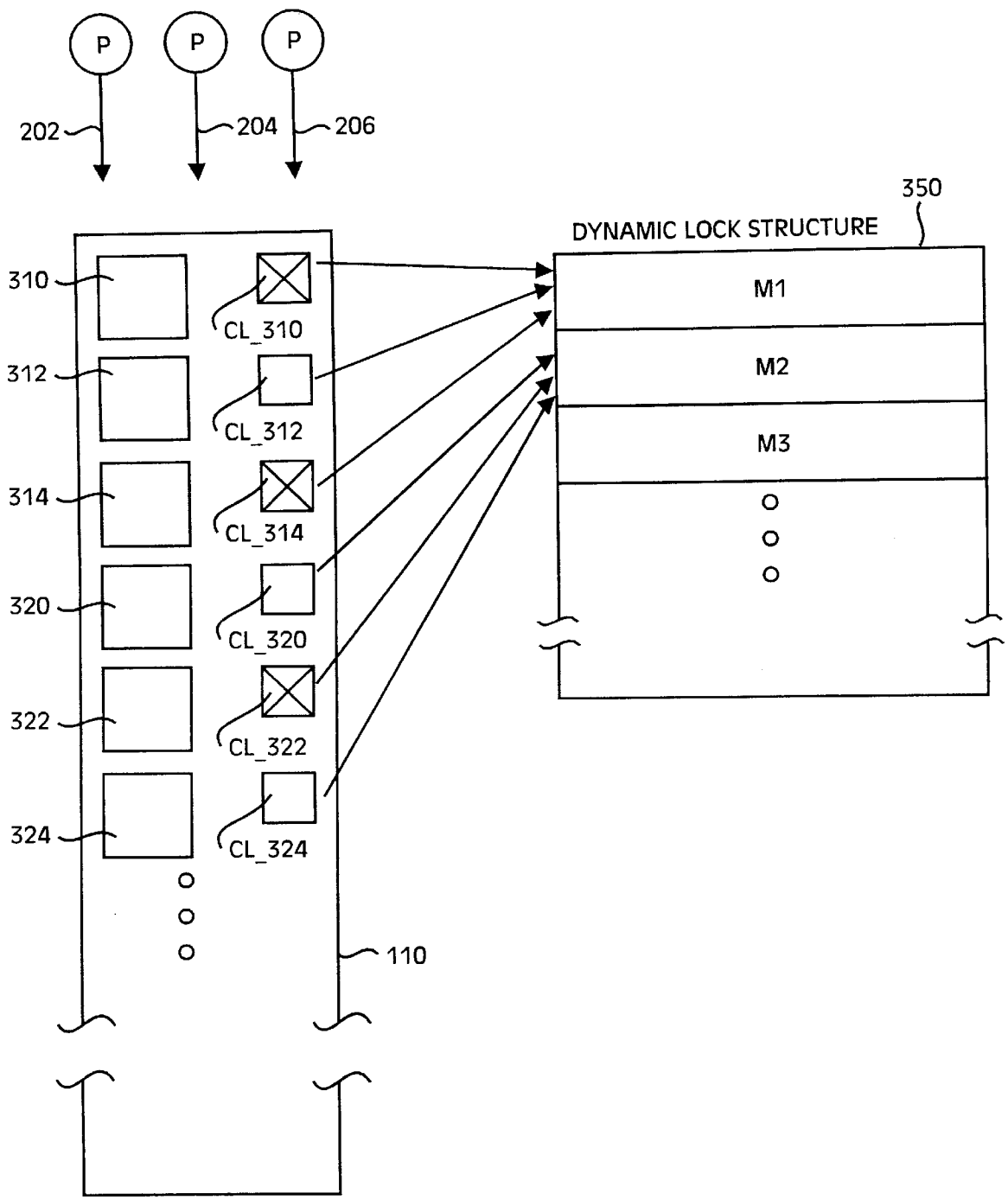
FIG. 3 illustrates, in accordance with one aspect of the present invention, the structures employed to avoid access conflicts.

To further elaborate on the features and advantages of the present invention, reference may be made to FIG. 3. In FIG. 3, there is shown in storage facility 110, which stores a plurality of stored data objects 310, 312, 314, 320, 322, and 324. A plurality of conceptual locks CL_310, CL_312, CL_314, CL_320, CL_322, and CL_324, which are associated with respective stored data objects 310, 312, 314, 320, 322, and 324, are depicted to conceptually indicate whether a particular stored data object is currently being accessed by a thread (and therefore attempted accesses by other threads should be locked out). For example, conceptual lock CL_310 is depicted to be in a locked state, indicating that a thread, e.g., thread 202, is currently accessing stored data object 310 and attempted access to stored data object 310 by any other thread, e.g., thread 204 or 206, should be refused. Likewise, conceptual lock CL_314 is depicted in its locked state, thereby preventing access to its associated stored data object 31 by any other thread except the thread currently accessing its corresponding stored data object 314. On the other hand, conceptual locks CL_312, CL_320, CL_322, and CL_324 are depicted in their unlocked state, indicating that any of threads 202, 204, and 206 may request access to their associated stored data objects and have those requests immediately granted.

To keep track of the conceptual locks that are locked at any given point in time, there is provided, in accordance with one aspect of the present invention, a dynamic lock structure 350. The function of dynamic lock structure 350 is to govern access to the stored data objects for the purpose of preventing access conflicts. Unlike the conceptual locks herein, dynamic lock structure 350 and its constituent parts are actually implemented memory, i.e., real physical storage facility resources are actually employed in the implementation of dynamic lock structure 350. Since dynamic lock structure 350 is required to keep track of only the identity of the conceptual locks (which may represent the identity of the stored data object in one embodiment) that are currently accessed by a thread, the total amount of storage facility resource devoted to its implementation is advantageously smaller compared to that required in the prior art, e.g., to the amount of memory required to implement the lock flags of prior art FIG. 2.

As shown in FIG. 3, dynamic lock structure 350 comprises a plurality of structure members of which three members M1, M2, and M3 are shown. In accordance with one aspect of the present invention, there are advantageously fewer dynamic lock structure members in dynamic lock structure 350 than there are conceptual locks. To keep the number of dynamic lock structure members low, a plurality of conceptual locks are mapped into each dynamic lock structure member in accordance to some mapping function. A suitable mapping function preferably makes it likely that conceptual locks in simultaneous use map to different dynamic lock structure members, while, at the same time, should execute quickly. Systems could, for example, select bits from the middle of a stored data object's address (using, for example, an appropriate bit mask and shift instructions) or may use any conventional hash function. In the example of FIG. 3, all conceptual locks in the CL_310 to CL_319 range map into dynamic lock structure member M1 while all conceptual locks in the CL_320 to CL_329 range maps into dynamic lock structure member M2, and so on.

Figure 4A:
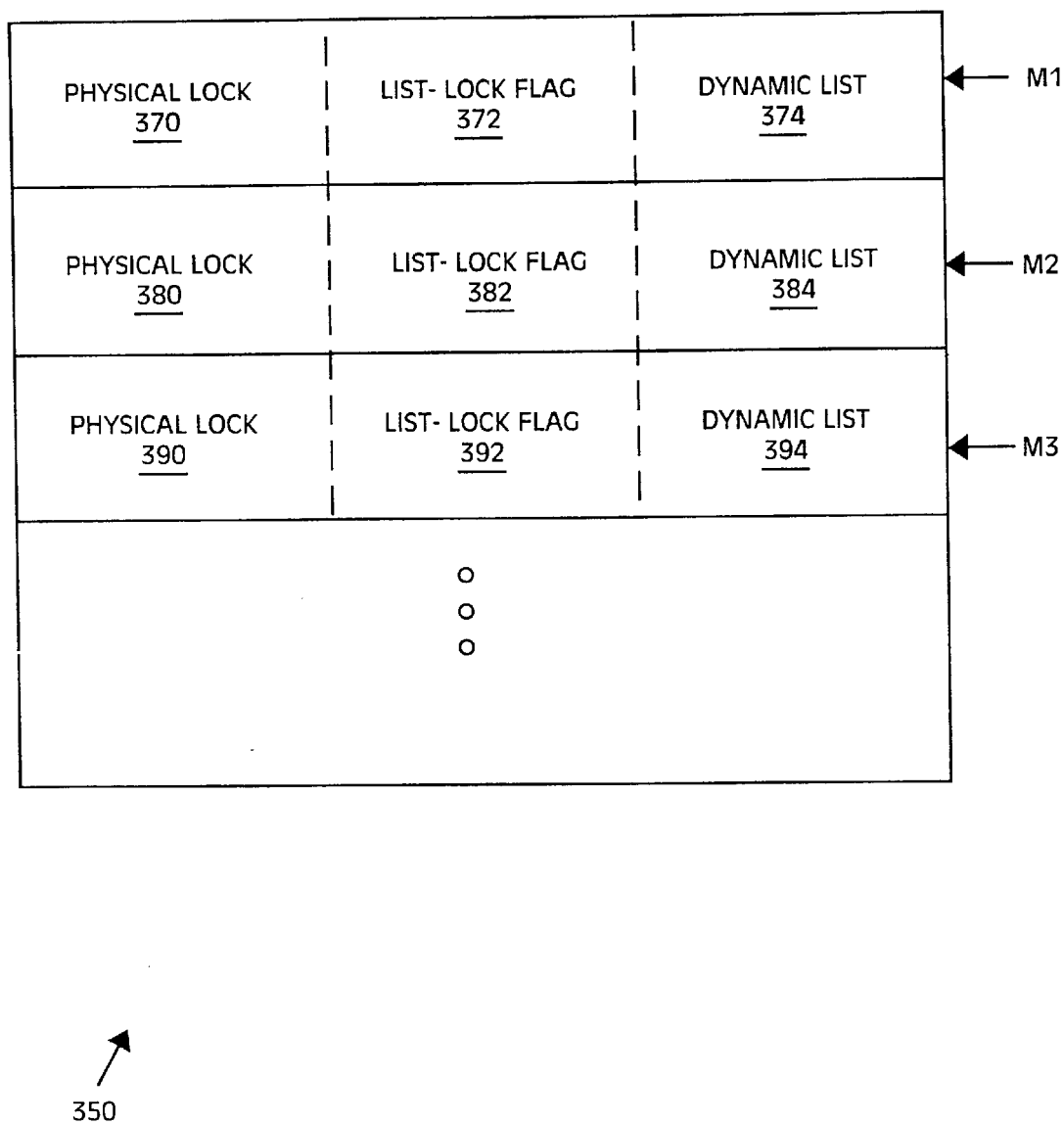
FIG. 4A illustrates, in greater detail and in accordance with one aspect of the present invention, the dynamic lock structure of FIG. 3.
Figure 4B:
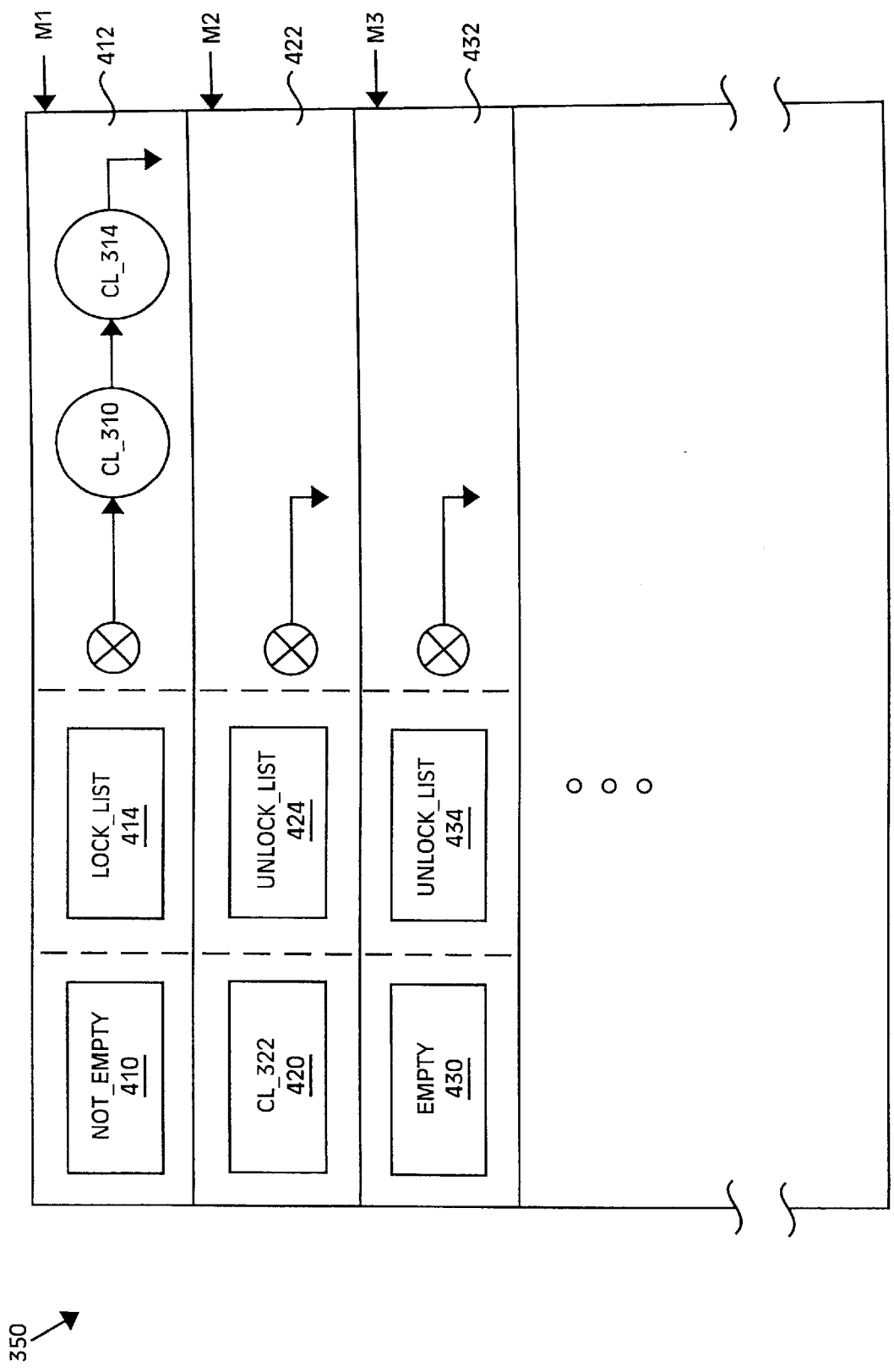
FIG. 4B shows, in one example, the various parameters that may be present in each member of the dynamic lock structure of FIG. 3.

FIGS. 4A and 4B show, in greater detail and in accordance with one embodiment of the present invention, a portion of dynamic lock structure 350, including dynamic lock structure members M1, M2, and M3. Within each dynamic lock structure member, e.g., dynamic lock structure member M1, there is shown a physical lock portion, a list-lock flag portion, and a dynamic list portion. In one embodiment, a physical lock portion includes the memory structure for storing either an identity of one of the conceptual locks that map into the corresponding dynamic structure member, or a flag that indicates whether the dynamic list associated with this dynamic lock structure member is empty. Since a conceptual lock exists as a concept only, it should be appreciated that the identity of a conceptual lock may, in one embodiment, be represented by the identity of its corresponding stored data object. If a stored data object is stored in memory, for example, it may be identified by its starting address. The flags EMPTY/NOT_EMPTY that may be stored in the physical lock portion may be implemented, in one embodiment, by a single bit, e.g., by the zero and one value of one single bit. Alternatively, it is possible to use other conventional lock implementations.

With reference to dynamic lock structure member M1 of FIG. 4B, for example, physical lock 410 is shown storing a flag NOT_EMPTY, which indicates that a dynamic list 412 associated with dynamic lock structure member M1 is not empty. On the other hand, physical lock 430 of dynamic lock structure member M3 is shown storing a flag EMPTY, indicating that a corresponding dynamic list 432 of dynamic lock structure member M3 is currently empty.

A conceptual lock that maps into a dynamic lock structure member may have its identity stored in the physical lock portion of that dynamic lock structure member if it is the only conceptual lock among all conceptual locks mapping to that dynamic lock structure member that is currently accessed by a thread. By way of example, since only conceptual lock CL_322 among all conceptual locks that map into dynamic lock structure member M2 is currently accessed, the identity of conceptual lock CL_322 is preferably stored in the physical lock portion of dynamic lock structure member M2, i.e., physical lock portion 420. As will be discussed in detail later, whenever a conceptual lock identity can be stored in the physical lock portion of a dynamic lock structure member, the invention advantageously takes advantage of this fact to improve the speed at which a thread can access a stored data object and obtains or releases the conceptual lock.

Each dynamic lock structure member of dynamic lock structure 350 further includes a list-lock flag. The list-lock flag is employed to indicate whether the dynamic list associated with that list-lock flag, i.e., belonging to the same dynamic lock structure member, is accessible at a given point in time. In the embodiment of FIG. 4B, the list-lock flag may have two states, LOCK_LIST and UNLOCK_LIST, and may be implemented, in one embodiment, by a single bit, e.g., by the zero and one value of one single bit. By way of example, dynamic lock structure member M1 is shown having a list-lock flag 414, which currently stores the "LOCK_LIST" state, indicating that access to the corresponding dynamic list 412 is currently not permitted.

In accordance with one aspect of the present invention, the dynamic list portion of each dynamic lock structure member contains a dynamically created list of conceptual lock identities. The conceptual lock identities stored in a dynamic list represents identities of the conceptual locks that map into the dynamic lock structure member corresponding to that dynamic list and currently "locked" because their associated stored data objects are being accessed. In accordance with one aspect of the present invention, the use of dynamically created lists, e.g., a linked list data structure, to store conceptual lock identities flexibly and advantageously minimizes storage facility usage.

A dynamic list may be empty, e.g., as shown in the case of dynamic lists 422 and 432 of dynamic lock structure members M2 and M3, respectively. The physical lock portion associated with an empty dynamic list in a dynamic lock structure member may store either the identity of one of the conceptual locks that maps into its associated dynamic lock structure member and currently locked (if the dynamic lock structure members currently stores only one conceptual lock identity), or the flag EMPTY if no conceptual lock identity is stored in either the dynamic list portion or the physical lock portion of the dynamic lock structure member. A physical lock storing a conceptual lock identity and one storing an EMPTY flag are shown in respective physical lock 420 of dynamic lock structure member M2 and physical lock 430 of dynamic lock structure member M3.

Alternatively, a dynamic list may contain a plurality of conceptual lock identities. As mentioned earlier, when the dynamic lock structure member stores only one conceptual lock identity, that conceptual lock identity is preferably stored in the physical lock portion of the dynamic lock structure member to improve the access speed. On the other hand, when the dynamic lock structure member stores more than one conceptual lock identity, i.e., the identities of the conceptual locks that both map into this dynamic lock structure member and accessed by some thread, all of these multiple conceptual lock identities are preferably stored in the dynamic list portion. In this manner, the dynamic list portion contains either two or more conceptual lock identities, or none. When the dynamic list portion of a dynamic lock structure member is not empty, the physical lock portion associated with that dynamic lock structure member preferably stores the NOT_EMPTY flag. With reference to FIG. 4, the NOT_EMPTY flag is shown stored in physical lock 410 portion of dynamic lock structure member M1 when dynamic list 412 is employed to store two conceptual lock identities, corresponding to two stored data objects accessed by some thread and mapped into dynamic lock structure member M1.

The presence of flag NOT_EMPTY in the physical portion of a dynamic lock structure member advantageously directs a thread that is interested in acquiring or releasing a conceptual lock to look into the dynamic list. On the other hand, the presence of flag EMPTY in the physical portion of a dynamic lock structure member advantageously indicates to a thread that none of the conceptual locks that map into this dynamic lock structure member is currently accessed, i.e., any of them can be acquired. The presence of a conceptual lock identity in the physical portion of a dynamic lock structure member advantageously indicates to a thread that only this conceptual lock identity, out of all the conceptual locks that map into this dynamic lock structure member, is currently being held, and if this conceptual lock identity is not of interest, there is no need to look into the dynamic list since the dynamic list will be empty (and thus all other conceptual locks that map into this dynamic lock structure may be acquired if desired). Thus, conceptual locks can be acquired and released rapidly using only the physical lock portion (as long as simultaneously held conceptual locks map to different dynamic lock structure members, a situation made likely by an appropriately chosen hash function).

Figure 5A:
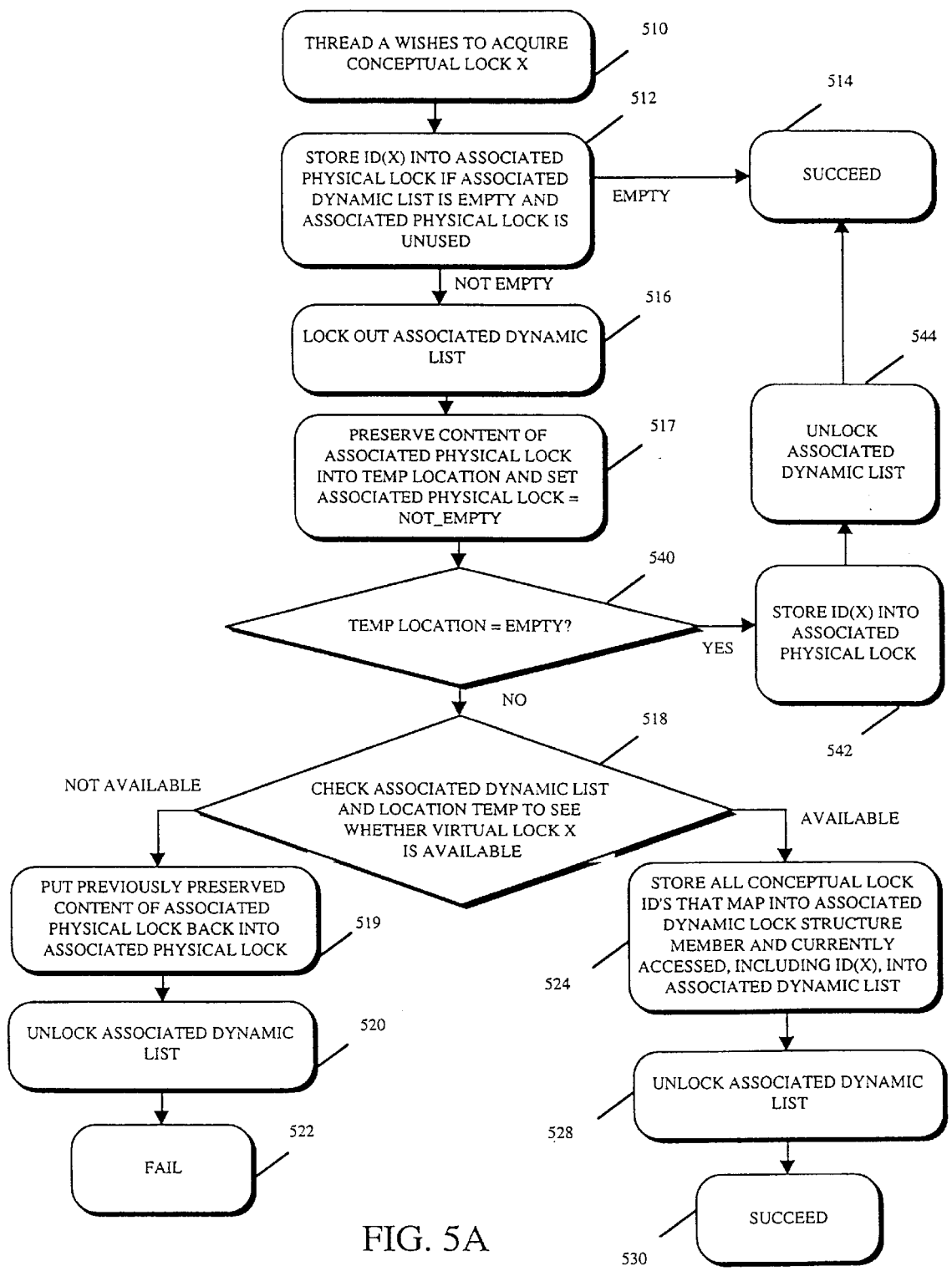
FIGS. 5A and 5B are flowcharts illustrating, in one embodiment, the steps involved when a thread wishes to acquire a conceptual lock to access a stored data object.
Figure 5B:
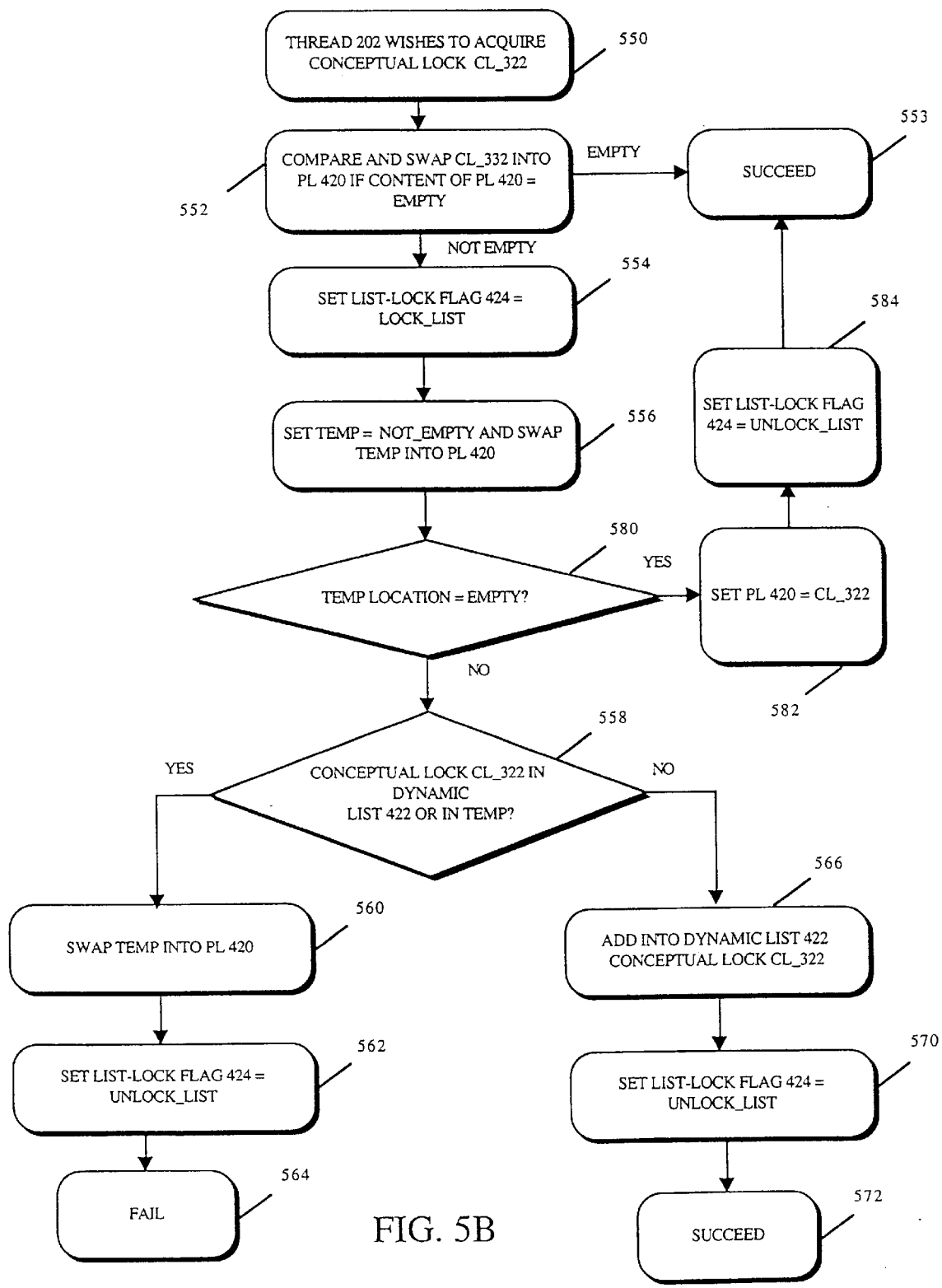
Figure 6A:
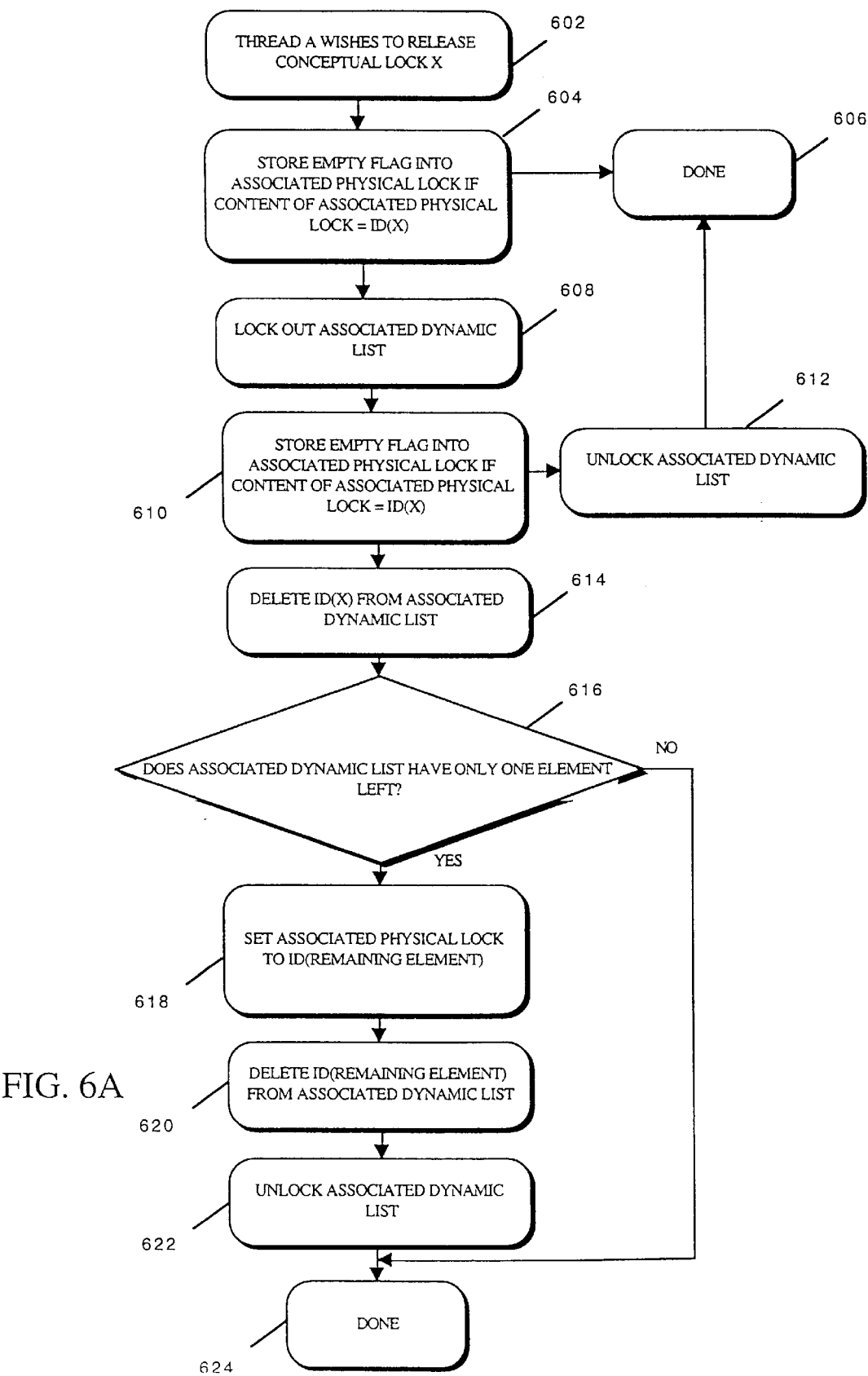
FIGS. 6A and 6B are flowcharts illustrating, in one embodiment, the steps involved when a thread wishes to release a conceptual lock.
Figure 6B:
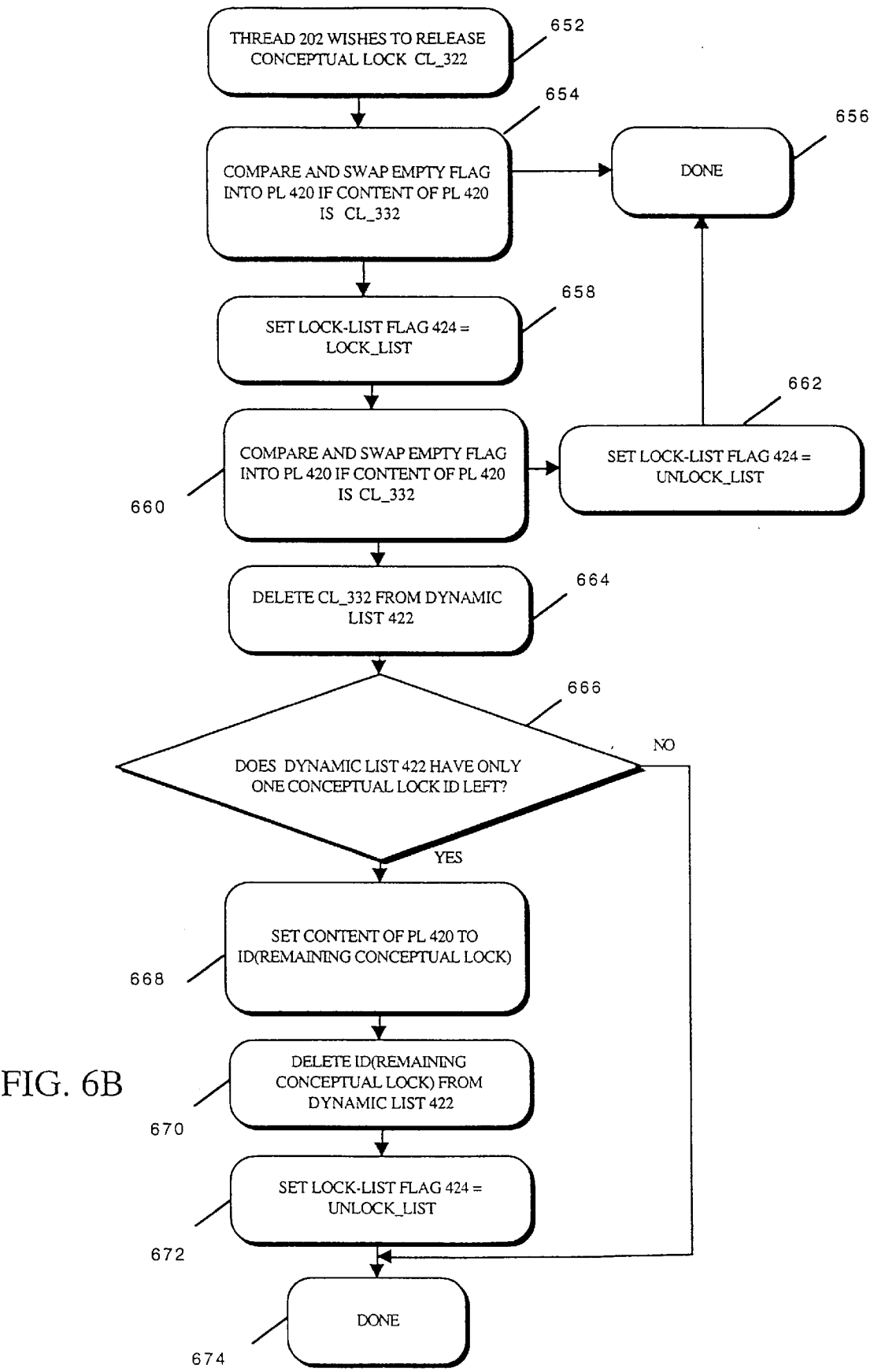

The operation of the inventive dynamic lock structure and its role in the inventive access conflict avoidance technique may be better understood with reference to FIGS. 5A, 5B, 6A, and 6B. FIGS. 5A and 6A illustrate the steps taken, in accordance with one embodiment of the invention, to ensure that access conflict does not occur when a thread, e.g., thread 202 of FIG. 3, wishes to access a stored data object. FIGS. 5B and 6B provide examples to further assist in the discussion of the steps of respective FIGS. 5A and 6A.

FIG. 5A shows, in accordance with one aspect of the present invention, the steps involved when a given thread wishes to acquire a conceptual lock associated with a stored data object to prevent another thread from accessing that stored data object while its conceptual lock is being held. In step 510, a given thread, e.g., thread A, wishes to acquire a given conceptual lock, e.g., conceptual lock X, to prevent another thread from accessing the stored data object associated with conceptual lock X while conceptual lock X is held.

If the dynamic list of the dynamic lock structure member into which conceptual lock X maps is empty, and the associated physical lock is unused for storing another conceptual lock identity, the identity of conceptual lock X is stored into the physical lock portion of this dynamic lock structure member (step 512). If the identity of conceptual lock X is successfully stored into the physical lock portion, the method proceeds to step 514, wherein it returns to the thread that wishes to acquire conceptual lock X, e.g., thread A, a message indicating that conceptual lock X has been obtained and no other thread may access the stored data object associated with conceptual lock X while thread A holds conceptual lock X.

On the other hand, if the associated dynamic list is not empty (thereby causing the associated physical lock to store the NOT_EMPTY flag) or if the associated physical lock is used to store the identity of another conceptual lock, the method proceeds to step 516 wherein the associated dynamic list is locked out to permit thread A to begin manipulating the associated dynamic list. Note that the method proceeds to step 516 only if the dynamic lock structure member into which conceptual lock X maps currently holds one or more conceptual lock identity. If another thread currently locks out the associated dynamic list, the method preferably waits in step 516 until it can obtain the associated dynamic list and locks it out before proceeding to subsequent steps of FIG. 5A.

In step 517, the method saves the conceptual lock identity, if any, held in the physical lock into a temporary storage variable TEMP. Further, the content of the physical lock is set to the flag NOT_EMPTY, indicating that the dynamic list associated with this dynamic lock structure may not be empty when the steps of FIG. 5A are completed. Step 517 advantageously facilitates the subsequent storage into the dynamic list of any conceptual lock identity that was held in the physical lock portion if conceptual lock X can be acquired by thread A. As will be seen later in FIG. 5, if it turns out that conceptual lock X is already held by another thread and cannot be acquired by thread A, the method reverses step 517 in a subsequent step to restore whatever value stored in the physical lock before letting thread A know that the attempt to obtain lock X has failed.

Before proceeding to examine the dynamic list, step 540 examines the location TEMP to ascertain whether it contains the flag EMPTY. TEMP location may contain flag EMPTY at this point in the process if, for example, another thread unlocks the last conceptual lock stored in the physical lock portion of the dynamic lock structure member after thread A completes step 512 and before thread A performs step 516.

If location TEMP contains the flag EMPTY (as ascertained in step 540), the method proceeds to step 542 to store the identity of conceptual lock X into the physical lock portion. Thereafter, the method proceeds to step 540 wherein it undoes step 516, i.e., it unlocks the associated dynamic to allow other threads to access this dynamic list. In step 514, a message is returned to the thread that wishes to acquire conceptual lock X, e.g., thread A, to indicate that conceptual lock X has been obtained and no other thread may access the stored data object associated with conceptual lock X while thread A holds conceptual lock X. As can be appreciated, the path through steps 540, 542, 544, and 514 represents an optimization since no manipulation or checking of the associated dynamic list is necessary to enable thread A to acquire conceptual lock X.

If location TEMP does not contain the flag EMPTY (as ascertained in step 540), the method proceeds to step 518 to check both the dynamic list and the location TEMP associated with this dynamic lock structure member to see whether conceptual lock X is available. Conceptual lock X is not available if it is currently accessed by another thread, which causes its identity to be stored already in either the associated dynamic list or in the TEMP location (which obtains its value from the physical lock in the swap step 517). When not available, the method proceeds to step 519 wherein it undoes earlier step 517 by restoring whatever value earlier stored in the physical lock portion back into the physical lock portion. The method then proceeds to step 520 to unlock the associated dynamic list to allow another thread to access the associated dynamic list. Thereafter, the method returns, in step 522, a message to thread A to inform thread A that the attempt to acquire conceptual lock X has failed.

On the other hand, if it is ascertained in step 518 that conceptual lock X is available (the identity of conceptual lock X is stored neither in associated dynamic list nor in the TEMP location), the method proceeds to step 524 wherein the method stores all conceptual lock IDs that map into this dynamic lock structure and currently held by a thread, including the identity of conceptual lock X, into the associated dynamic list. After step 524 is performed, the multiple conceptual lock identities that map into the dynamic lock structure associated with conceptual lock X and currently held are now stored in the associated dynamic list.

In step 528, the method then unlocks the associated dynamic list to allow another thread to access this associated dynamic list. The method then returns to thread A a message in step 530 to inform thread A that the attempt to acquire conceptual lock X is successful, and conceptual lock X is now held, preventing another thread from accessing it.

FIG. 5B illustrates, in one example, the steps of FIG. 5A wherein a thread 202 wishes to acquire conceptual lock CL_322 of FIG. 4B (step 550). Since conceptual lock CL_322 maps into dynamic lock structure M2, the method compares, in step 552, the value of physical lock 420 with the flag EMPTY (which may be represented by value zero in one embodiment), and swaps in the identity of conceptual lock CL_322 with the content of physical lock 420 if the content of physical lock 420 equals EMPTY.

The content of physical lock 420 equals EMPTY when the dynamic lock structure member into which conceptual lock CL_322 maps, i.e., dynamic lock structure member M2, does not store the identity of any of its associated conceptual locks, e.g., any of conceptual locks CL_320, CL_322, and CL_324 of FIG. 3. If physical lock 420 stores the EMPTY flag, as ascertained in step 552, the compare and swap operation is successful, and the method proceeds to step 553 wherein it informs thread 202 that the attempt to acquire conceptual lock CL_322 is successful. Following step 553, the identity of conceptual lock CL_322 is stored in physical lock 420.

On the other hand, if it is ascertained in step 552 that the content of physical lock 420 does not equal the flag EMPTY (either physical lock 420 stores flag state NOT_EMPTY, which indicates that the dynamic list associated with dynamic lock structure M2, i.e., dynamic list 422, is not empty, or if physical lock 420 currently stores the identity of a conceptual lock) the method proceeds to step 554 wherein the list-lock flag 424 is set to the state LOCK_LIST. In step 554, the method acquires dynamic list 422 on behalf of thread 202 by locking out other threads that may attempt to access dynamic list 422. In one embodiment, the LOCK_LIST may be represented simply by value 1 of a single bit.

The setting of the list-lock flag 424 to LOCK_LIST permits the method to manipulate the dynamic list associated with dynamic lock structure M2 on behalf of thread 202 without interference from other threads. In step 556, the temporary storage location TEMP is set to the flag NOT_EMPTY and this temporary storage location TEMP is swapped into physical lock 420.

In step 558, the method ascertains whether the identity of conceptual lock CL_322 has already been stored in either dynamic list 422 or in the temporary location TEMP. If the identity of conceptual lock CL_322 has already been stored in either dynamic list 422 or in temporary location TEMP, another thread has already acquired conceptual lock CL_322. In this case, the attempt by thread 202 to acquire conceptual lock CL_322 has failed and the method proceeds to step 560 to swap the identity of temporary location TEMP back into physical lock 420, i.e., undoing the earlier swap of step 556.

In step 562, the method sets the list-lock flag 424 to UNLOCK_LIST, i.e., undoes the earlier locking step 554, to permit other threads to access dynamic list 422. In step 564, the method returns to thread 202 a message indicating that the attempt to acquire conceptual lock CL_322 has failed.

On the other hand, if it is ascertained in step 558 that the identity of the desired conceptual lock, i.e., conceptual lock CL_322, is not stored in either dynamic list 422 or in the temporary storage location TEMP, conceptual lock CL_322 has not been acquired by any other thread and may now be acquired by thread 202. In this case, the method proceeds to step 566 wherein it adds to dynamic list 422 the identity of conceptual lock CL_322.

In step 570, the method sets list-lock flag 424 to the state UNLOCK_LIST in order to undo the earlier locking step 554, thereby allowing other threads to access dynamic list 422. In step 572, the method returns to thread 202 a message indicating that the attempt by thread 202 to acquire conceptual lock CL_322 is successful.

In step 580, the method checks whether the location TEMP equals EMPTY. If so, it proceeds to obtain conceptual lock CL_322 though the faster path involving steps 582, 584, and 553. Steps 582 and 584 are analogous to steps 542 and 544 described earlier in connection with FIG. 5A. Thereafter, the method proceeds to step 553 to inform thread 202 that the attempt to acquire conceptual lock CL_322 is successful.

Note that in FIG. 5B, thread 202 may acquire conceptual lock CL_322 through three different paths. If dynamic lock structure member M2 previously stores no conceptual lock identity and conceptual lock CL_322 represents the first conceptual lock stored by this dynamic lock structure member M2, the method proceeds through steps 550, 552, and 553 to quickly permit thread 202 to acquire conceptual lock 322. These steps are not only few in number, but are also relatively fast since the swap operation in step 552 is typically one of the faster operations that can be performed by a processor. Advantageously, the performance of the inventive access conflict avoidance system in this case is substantially as efficient as prior art methods, which require a substantially larger amount of storage facility overhead to store a lock flag for every single stored data object.

On the other hand, if there is a race condition in between steps 552 and 554, the method can still accomplish the acquisition of the conceptual lock via a relatively fast path (550/552/554/556/580/382/584/443) without requiring the manipulation or checking of the associated dynamic list.

On the other hand, if dynamic lock structure member M2 already holds one or more conceptual lock identities, e.g., one of conceptual locks CL_320, CL_322, and CL_324, the method proceeds through the path comprising steps 550, 552, 554, 556, 558, 566, 568, 570, and 572 to correctly permit thread 202 to acquire conceptual lock X and to permit these multiple conceptual lock identities to be stored in the dynamic list of dynamic lock structure member M2.

FIG. 6A illustrates, in accordance with one aspect of the present invention, the steps involved when a thread, e.g., thread A, wishes to release a conceptual lock, e.g., conceptual lock X that it acquired earlier (step 602). In step 604, the EMPTY flag is stored into the content of the associated physical lock if the content of the associated physical lock contains the identity of conceptual lock X. If the content of the associated physical lock is the identity of conceptual lock X, no other conceptual lock IDs are stored by the dynamic lock structure member into which conceptual lock X maps. In this case, the release may be performed quickly in step 604, and conceptual lock X is considered released and available for acquisition by another thread in step 606.

On the other hand, if the content of the associated physical lock is not the identity of conceptual lock X, the dynamic lock structure member into which conceptual lock X maps currently stores more than one conceptual lock identity. In this case, the method proceeds to steps 608 wherein the associated dynamic list is locked out to prevent other threads from coming along and modifying this associated dynamic list while the method, on behalf of thread A, releases conceptual lock X by removing it from the associated dynamic list.

In step 610, the method may again perform the check-and-swap operation of earlier step 604. The check-and-swap operation of step 610 is desirable after the associated dynamic list is locked out (in step 608) because while the method tries to lock out the associated dynamic list in step 608, another thread that is operating concurrently with thread A may have put the identity of conceptual lock X into the associated physical lock. The reason for another thread to put the identity of conceptual lock X into the associated physical lock has to do with optimization and will be apparent in view of the remaining discussions of FIG. 6A.

If it is ascertained in step 610 that the content of the associated physical lock is the identity of conceptual lock X and the check-and-swap operation is successful, the method proceeds to step 612 wherein the associated dynamic list is unlocked, i.e., reversing the lock-out step 608, to permit other threads to access the associated dynamic list. After step 612 is performed, conceptual lock X is considered released by thread A and can be acquired by another thread.

On the other hand, if it is determined in step 610 that the content of the associated physical lock is still not the identity of conceptual lock X, i.e., the check-and-swap operation failed again, the method proceeds to step 614 wherein the identity of conceptual lock X is removed from the associated dynamic list. Since the identity of conceptual lock X is no longer in the associated dynamic list and it was not in the content of the associated physical lock (as determined in step 610), the dynamic lock structure member into which conceptual lock X maps no longer keeps track of the identity of conceptual lock X after step 614 is performed. A subsequent thread may now come along and acquire conceptual lock X after the steps of FIG. 6A are finished.

In steps 616, 618, 620, 622, and 624, the method optimizes the dynamic lock structure member, if possible, so that if the dynamic lock structure member into which conceptual lock X maps now stores only one conceptual lock identity, that conceptual lock identity is preferably moved into the content of the associated physical lock. In this manner, when the thread that holds the one remaining conceptual lock wishes to release it, it may do so quickly via the path that includes steps 602, 604, and 606. Without this optimization, a physical lock set to the flag NOT_EMPTY may never be set to flag EMPTY. Returning to the EMPTY state is advantageous since it allows the conceptual lock to be rapidly released via path 602/604/606.

In step 616, the method ascertains whether the associated dynamic list has only one conceptual lock identity left after the identity of conceptual lock X was deleted from the associated dynamic list (in step 614). If there are more than one conceptual lock IDs remaining to be tracked by the associated dynamic lock structure member, the method proceeds to step 624 wherein the steps of releasing conceptual lock X by thread A are finished.

On the other hand, if the dynamic lock structure member into which conceptual lock X maps tracks only one conceptual lock identity in its associated dynamic list, the method proceeds from step 616 to step 618 wherein the content of the associated physical lock is set to the identity of the one remaining conceptual lock. In step 620, the identity of this one remaining conceptual lock is deleted from the associated dynamic list so that the associated dynamic lock structure member does not track this one remaining conceptual lock in both its physical lock and its dynamic list. In step 622, the method unlocks the associated dynamic list, i.e., reversing the locking step 608, to permit subsequent threads to access the associated dynamic list. In step 624, the steps involved in releasing conceptual lock X are finished.

The steps of FIG. 6A may be more fully understood with reference to the example illustrated by FIGS. 6B (in view of FIG. 4B). In FIG. 6B, thread 202 wishes to release a conceptual lock CL_322 that it acquired earlier (step 652). In step 654, the EMPTY flag is stored into the content of the associated physical lock 420 (of FIG. 4B) if the content of the physical lock 420 contains the identity of conceptual lock CL_322. If the content of associated physical lock 420 is the identity of conceptual lock CL_322, no other conceptual lock IDs are stored by the dynamic lock structure member into which conceptual lock CL_322 maps, i.e., dynamic lock structure member M2. In this case, the release may be performed quickly in step 654, and conceptual lock CL_322 is considered released and available for acquisition by another thread in step 656.

On the other hand, if the content of the associated physical lock 420 is not the identity of conceptual lock CL_322, it is understood that dynamic lock structure member M2 currently stores more than one conceptual lock identity (at least one more in addition to currently held conceptual lock CL_322). In this case, the method proceeds to steps 658 wherein the associated dynamic list 422 is locked out (by setting lock-list flag 424 to flag state LOCK_LIST) to prevent other threads from coming along and modifying this associated dynamic list 422 while the method, on behalf of thread 202, releases conceptual lock CL_322 by removing it from the associated dynamic list 422.

In step 660, the method may again perform the check-and-swap operation of earlier step 654. The check-and-swap operation of step 660 is desirable after the associated dynamic list 422 is locked out (in step 658) because while the method tries to lock out the associated dynamic list 422 in step 658, another thread that operates concurrently with thread 202 may have put the identity of conceptual lock CL_322 into the associated physical lock 420. The reason for another thread to put the identity of conceptual lock CL_322 into the associated physical lock 420 has been discussed earlier in connection with steps 616, 618, 620, 622, and 624 of FIG. 6A.

If it is ascertained in step 660 of FIG. 6B that the content of the associated physical lock 420 is the identity of conceptual lock CL_322 and the check-and-swap operation is successful, the method proceeds to step 662 wherein the associated dynamic list 422 is unlocked, i.e., reversing the lock-out step 658, to permit other threads to access the associated dynamic list 422. After step 662 is performed, conceptual lock CL_322 is considered released by thread 202 and can be acquired by another thread.

On the other hand, if it is determined in step 660 that the content of the associated physical lock 420 is still not the identity of conceptual lock CL_322, i.e., the check-and-swap operation failed again, the method proceeds to step 664 wherein the identity of conceptual lock CL_322 is removed from the associated dynamic list 422. Since the identity of conceptual lock CL_322 is no longer in the associated dynamic list 422 and it was not in the content of the associated physical lock 420 (as determined in step 660), dynamic lock structure member M2 no longer keeps track of the identity of conceptual lock CL_322 after step 664 is performed. A subsequent thread may now come along and acquire conceptual lock CL_322 after the steps of FIG. 6B are finished.

In steps 666, 668, 670, 672, and 674, the method optimizes dynamic lock structure member M2, if possible, so that if dynamic lock structure member M2 now stores only one conceptual lock identity, that conceptual lock identity is preferably moved into the content of the associated physical lock 420. In this manner, when the thread that holds the one remaining conceptual lock wishes to release it, it may do so quickly via the path that includes steps 652, 654, and 656.

In step 666, the method ascertains whether the associated dynamic list 422 has only one conceptual lock identity left after the identity of conceptual lock CL_322 was deleted from the associated dynamic list 422 (in step 664). If there are more than one conceptual lock IDs remaining to be tracked by the associated dynamic lock structure member M2, the method proceeds to step 674 wherein the steps of releasing conceptual lock CL_322 by thread 202 are finished.

On the other hand, if dynamic lock structure member M2 tracks only one conceptual lock identity in its associated dynamic list 422, the method proceeds from step 666 to step 668 wherein the content of the associated physical lock 420 is set to the identity of the one remaining conceptual lock. In step 670, the identity of this one remaining conceptual lock is deleted from the associated dynamic list 422 so that the associated dynamic lock structure member M2 does not track this one remaining conceptual lock in both its physical lock 420 and its dynamic list 422.

In step 672, the method unlocks the associated dynamic list 422, i.e., reversing the locking step 668 by setting the lock-list flag 424 to flag state UNLOCK_LIST, to permit subsequent threads to access the associated dynamic list 422.

Note that the present invention employs multiple dynamic lists to keep track of conceptual lock identities. Further, a dynamic list is employed when there are multiple conceptual locks held by the dynamic lock structure member associated with that dynamic list. If a single dynamic list had been employed instead to track all conceptual locks held, a thread must search through the entire list in order to determine whether a given lock is currently held or to delete a currently held lock from that list. For a large number of conceptual locks held, this search may be unduly time-consuming and may well render the implementation impractical.

In the invention, a relatively small number of conceptual locks (maybe 3 or 4, in one embodiment), is mapped to a given dynamic lock structure member. In this manner, the maximum number of conceptual locks held by a dynamic list is kept relatively low, thereby improving the speed at which a conceptual lock may be acquired or released. Further, the dynamic list is only employed when there are multiple conceptual locks held by the dynamic lock structure member associated with that dynamic list. When the dynamic lock structure member tracks only one conceptual lock identity, it preferably utilizes the physical lock portion for tracking, thereby allowing the invention to acquire and release conceptual locks substantially as fast as the prior art, which physically requires a lock for every stored data object.

Further, the performance of the computer system may be tuned, in one embodiment, by choosing an optimal number of dynamic structure members so that statistically, each dynamic lock structure member, on average, holds only a few or one conceptual lock. In the embodiment that optimizes performance by permitting each dynamic lock structure member to hold, on average, one conceptual lock identity (therefore maximizing use of the physical lock), the computer designer may choose the number of dynamic lock structure members to be roughly proportional to the average number of stored data objects being accessed at a given point in time. This average number of stored data objects being accessed at a given point in time may be determined, for example, in a trial-and-error manner, by statistical methods, or any other conventional method. For example, if it is ascertained that only one-tenth of the available conceptual locks are held at any one given point in time, the dynamic structure may have (N/10) dynamic lock structure members (where N represents the total number of conceptual locks), or some integer multiple thereof, to ensure that on average, only one conceptual lock identity is stored in a dynamic lock structure member, i.e., in the physical lock portion thereof. In this manner, access speed may be advantageously maximized. In other embodiments, the designer may tradeoff speed and memory overhead by reducing number of dynamic lock structure member. Even if a dynamic lock structure member, on average, holds more than one conceptual lock identity, the goal of reducing the prior art's memory overhead is still advantageously achieved.

Further, the invention applies equally well for systems which employ other types of locks than the lock described herein. In some system, for example, a lock on a stored data object may be acquired when a thread accesses that stored data object for either reading or writing. In other systems, there may be locks that allow multiple threads to read a stored data object concurrently but permit no thread that wishes to write to that stored data object to acquire the lock. The adaptation of the invention described herein to different types of locks is within the skills of one skilled in the art given this disclosure.

Consequently, while this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer system having a first plurality of stored data objects and capable of running multiple threads concurrently, an apparatus for preventing access conflicts, said access conflicts arise when more than one of said multiple threads were allowed to simultaneously access one of said first plurality of stored data object, comprising:

a dynamic lock structure having a plurality of dynamic lock structure members that each include a physical lock, said plurality of dynamic lock structure members being fewer in number than a number of said first plurality of stored data objects, wherein a second plurality of stored data objects of said first plurality of stored data objects map into a first dynamic lock structure member of said plurality of dynamic lock structure members in accordance with a mapping function, said mapping function renders it likely that only one stored data object of said second plurality of stored data objects that maps into said first dynamic lock structure member is accessed at any given point in time by a thread of said multiple threads; and storage facility associated with said first dynamic lock structure member for storing identities of a third plurality of stored data objects, said third plurality of stored data objects represents a subset of said second plurality of stored data objects that are currently being accessed, whereby a stored data object having its identity stored in said dynamic lock structure cannot be accessed by any thread other than a thread currently accessing said stored data object.

2. The apparatus of claim 1 wherein said first dynamic lock structure member comprises a physical lock, said physical lock being configured to store an identity of a first stored data object, said first stored data object representing the only one of said second plurality of stored data objects that is currently accessed.

3. The apparatus of claim 2 wherein said first dynamic lock structure member further comprises a dynamic list for storing said identities of said third plurality of stored data objects if there are at least two stored data objects in said third plurality of stored data objects.

4. The apparatus of 3 wherein said physical lock is configured to alternatively store an EMPTY flag if said dynamic list is empty, else said physical lock is configured to alternatively store a NOT_EMPTY flag if said dynamic list stores identities of said at least two stored data objects.

5. The apparatus of claim 4 wherein said first dynamic lock structure member is employed by another thread to ascertain whether a given stored data object of said second plurality of stored data object is available for access by said another thread.

6. The apparatus of claim 5 wherein said physical lock is consulted first by said another thread to determine whether said physical lock stores an identity of said given stored data object, said thread being directed to consult said dynamic list if said physical lock stores said NOT_EMPTY flag.

7. The apparatus of claim 5 wherein said physical lock is consulted first by said another thread to determine whether said physical lock stores an identity of said given stored data object, said thread being directed to consult said dynamic list if said physical lock stores an identity of a stored data object.

8. The apparatus of claim 3 wherein said first dynamic lock structure member further comprises a link-lock flag, said link-lock flag when set prevents said dynamic list from being accessed for storing additional stored data object identity thereto or for removing previously stored identities of stored data objects therefrom by any other thread except a thread that originally sets said link-lock flag.

9. In a computer system having a first plurality of stored data objects and capable of running multiple threads concurrently, a method for preventing access conflicts, said access conflicts arise when more than one of said multiple threads were allowed to simultaneously access one of said first plurality of stored data object, comprising:

providing a dynamic lock structure having a plurality of dynamic lock structure members, and each of said plurality of dynamic lock structures includes a physical lock that is configured to alternatively store an EMPTY flag if said dynamic list is empty, else said physical lock is configured to alternatively store a NOT_EMPTY flag if said dynamic list stores identities of said at least two stored data objects; and mapping a second plurality of stored data objects of said first plurality of stored data objects into a first dynamic lock structure member of said plurality of dynamic lock structure members in accordance with a mapping function, thereby resulting in said plurality of dynamic lock structure members being fewer in number than a number of said first plurality of stored data objects, said first dynamic lock structure member being configured to store identities of a third plurality of stored data objects, said third plurality of stored data objects represents a subset of said second plurality of stored data objects that are accessed, whereby a stored data object having its identity stored in said dynamic lock structure cannot be accessed by any thread other than a thread currently accessing said stored data object.

10. The method of claim 9 wherein said physical lock is associated with said first dynamic lock structure member and configured to store an identity of a first stored data object, said first stored data object representing the only one of said second plurality of stored data objects that is accessed.

11. The method of claim 10 wherein said step of providing a dynamic lock structure further comprising:

providing a dynamic list, said dynamic list being configured to store identities of said third plurality of stored data objects if there are at least two stored data objects in said third plurality of stored data objects.

12. The method of claim 11 wherein said first dynamic lock structure member is configured such that another thread wishing to ascertain whether a given stored data object of said second plurality of stored data object is available for access by said another thread so ascertains by comparing an identity of said given stored data object with identities of stored data objects, if any, stored in said first dynamic lock structure member.

13. The method of claim 12 wherein said first dynamic lock structure member is configured such that said physical lock is consulted first by said another thread to determine whether said physical lock stores said identity of said given stored data object, said thread being directed to consult said dynamic list if said physical lock stores said NOT_EMPTY flag.

14. The method of claim 12 wherein said first dynamic lock structure member is configured such that said physical lock is consulted first by said another thread to determine whether said physical lock stores said identity of said given stored data object, said thread being directed to consult said dynamic list if said physical lock stores an identity of a stored data object.

15. The method of claim 11 wherein said step of providing a dynamic lock structure further comprising providing a link-lock flag, said link-lock flag when set prevents said dynamic list from being accessed for storing additional stored data object identity thereto or for removing previously stored identities of stored data objects therefrom by any other thread except a thread that originally sets said link-lock flag.

16. In a computer system having a first plurality of stored data objects and capable of running a first thread and a second thread concurrently, a method for preventing an access conflict, said access conflict arises if said first and second threads were allowed to simultaneously access a first stored data object of said first plurality of stored data object, said computer system having a dynamic lock structure including a dynamic lock structure member, a second plurality of stored data objects of said first plurality of stored data objects, including said first stored data object being mapped into said first dynamic lock structure member, said first dynamic lock structure member being configured to store identities of a third plurality of stored data objects, said third plurality of stored data objects represents a subset of said second plurality of stored data objects that are accessed, whereby a stored data object having its identity stored in said dynamic lock structure cannot be accessed by any thread other than a thread currently accessing said stored data object, comprising:

facilitating an attempted access by said first thread to said first stored data object, including:

if said dynamic lock structure member does not store any stored data object identity, storing an identity of said first stored data object into a physical lock portion of said dynamic lock structure;

else if said dynamic lock structure member stores only one identity of a second stored data object in said physical lock portion, said second stored data object being different from said first stored data object, storing both said identity of said first stored data object and said identity of said second stored data object into a dynamic list portion of said dynamic lock structure and storing a first flag into said physical lock portion of said dynamic lock structure, said first flag indicating that said dynamic list is currently not empty;

else if said dynamic lock structure member stores only one identity of a second stored data object, said second stored data object is the same as said first stored data object, rejecting said attempted access by said first thread to said first stored data object as failed;

else if said physical lock stores said first flag indicating that said dynamic list is currently not empty, consulting said dynamic list to ascertain whether said identity of said first data object is already stored in said dynamic list, further including:

rejecting said attempted access by said first thread to said first stored data object as failed if said dynamic list already stores said identity of said first data object; and else permitting said attempted access by said first thread to said first stored data object if said dynamic list has not already stored said identity of said first data object and storing said identity of said first stored data object into said dynamic list.

17. The method of claim 16 wherein said first thread permits other threads to access said first stored data object when said first thread is finished with accessing said first stored data object by removing said identity of said first stored data object from said physical lock portion of said dynamic lock structure member if said identity of said first stored data object represents the only stored data object identity stored by said dynamic lock structure member.

18. The method of claim 16 wherein said first thread permits other threads to access said first stored data object when said first thread is finished with accessing said first stored data object by removing said identity of said first stored data object from said dynamic list portion of said dynamic lock structure member if said dynamic lock structure member stores a plurality of stored data object identities prior to said removing.

19. The method of claim 18 further comprising the step of moving a remaining stored data object identity from said dynamic list portion to said physical lock portion, said remaining stored data object identity represents the only stored data object identity stored by said dynamic lock structure member after said identity of said first stored data object is removed from said dynamic list portion.

20. In a computer system having a first plurality of stored data objects and capable of running multiple threads concurrently, an apparatus for preventing access conflicts, said access conflicts arise when more than one of said multiple threads were allowed to simultaneously access one of said first plurality of stored data object, comprising:

a dynamic lock structure having a plurality of dynamic lock structure members, said plurality of dynamic lock structure members being fewer in number than a number of said first plurality of stored data objects, wherein a second plurality of stored data objects of said first plurality of stored data objects map into a first dynamic lock structure member of said plurality of dynamic lock structure members in accordance with a mapping function, said mapping function renders it likely that only one stored data object of said second plurality of stored data objects that maps into said first dynamic lock structure member is accessed at any given point in time by a thread of said multiple threads; and storage facility having a physical lock, a list lock flag and a dynamic list, said storage facility is associated with said first dynamic lock structure member and is configured to store identities of a third plurality of stored data objects, said third plurality of stored data objects represents a subset of said second plurality of stored data objects that are currently being accessed;

wherein a stored data object having its identity stored in said dynamic lock structure cannot be accessed by any thread other than a thread currently accessing said stored data object.

21. The apparatus of claim 20 wherein said physical lock is configured to store an identity of a first stored data object, said first stored data object representing the only one of said second plurality of stored data objects that is currently accessed.

22. The apparatus of claim 21 wherein said dynamic list is used for storing said identities of said third plurality of stored data objects if there are at least two stored data objects in said third plurality of stored data objects.

23. The apparatus of 22 wherein said physical lock is configured to alternatively store an EMPTY flag if said dynamic list is empty, else said physical lock is configured to alternatively store a NOT_EMPTY flag if said dynamic list stores identities of said at least two stored data objects.

24. In a computer system having a first plurality of stored data objects and capable of running multiple threads concurrently, a method for preventing access conflicts, said access conflicts arise when more than one of said multiple threads were allowed to simultaneously access one of said first plurality of stored data object, comprising:

providing a dynamic lock structure having a plurality of dynamic lock structure members, where each of said plurality of dynamic lock structure members has a physical lock that is configured to store an identity of a first stored data object, said first stored data object representing the only one of said second plurality of stored data objects that is accessed; and mapping a second plurality of stored data objects of said first plurality of stored data objects into a first dynamic lock structure member of said plurality of dynamic lock structure members in accordance with a mapping function, thereby resulting in said plurality of dynamic lock structure members being fewer in number than a number of said first plurality of stored data objects, said first dynamic lock structure member being configured to store identities of a third plurality of stored data objects, said third plurality of stored data objects represents a subset of said second plurality of stored data objects that are accessed, wherein a stored data object having its identity stored in said dynamic lock structure cannot be accessed by any thread other than a thread currently accessing said stored data object.

25. The method of claim 24 wherein said providing a dynamic lock structure further comprising:

providing a dynamic list, said dynamic list is configured to store identities of said third plurality of stored data objects if there are at least two stored data objects in said third plurality of stored data objects.

* * * * *